United States Patent
Shah (12) 
(10) Patent No.: US 8,874,697 B2
(45) Date of Patent: Oct. 28, 2014

(54) CONTENT DOWNLOAD BASED ON HASHES

(75) Inventor: Amit Shah, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 119 days.

(21) Appl. No.: 13/307,345

(22) Filed: Nov. 30, 2011

(65) Prior Publication Data
US 2013/0138775 A1    May 30, 2013

(51) Int. Cl.
*H04L 29/08* (2006.01)
*H04L 12/58* (2006.01)

(52) U.S. Cl.
CPC ........ *H04L 67/2842* (2013.01); *H04L 67/2895* (2013.01); *H04L 12/584* (2013.01)
USPC ........... 709/219; 709/203; 709/213; 709/217; 709/231; 707/679

(58) Field of Classification Search
CPC ... H04L 63/12; H04L 63/1408; H04L 67/108; H04L 12/584; G06F 2221/0784; G06F 17/30321; G06F 17/30091
USPC ........... 709/203, 213, 217, 219, 231; 707/679
See application file for complete search history.

(56) References Cited

U.S. PATENT DOCUMENTS

| | | | |
|---|---|---|---|
| 8,001,096 B2 * | 8/2011 | Farber et al. | 707/698 |
| 8,370,315 B1 * | 2/2013 | Efstathopoulos et al. | 707/696 |
| 2004/0162885 A1 * | 8/2004 | Garg et al. | 709/213 |
| 2009/0077252 A1 * | 3/2009 | Abdo et al. | 709/231 |
| 2009/0196296 A1 * | 8/2009 | Vachuska | 370/395.32 |
| 2010/0191805 A1 | 7/2010 | Lu et al. | |
| 2011/0029596 A1 | 2/2011 | Spatscheck et al. | |
| 2011/0238790 A1 * | 9/2011 | Rooney et al. | 709/219 |
| 2012/0060035 A1 * | 3/2012 | Kalmady et al. | 713/176 |
| 2012/0254319 A1 * | 10/2012 | Wheeler | 709/206 |

* cited by examiner

*Primary Examiner* — Hitesh Patel
(74) *Attorney, Agent, or Firm* — Lowenstein Sandler LLP (57) ABSTRACT

A mechanism for content download based on hashes is disclosed. A method of the invention includes receiving a request from a client computing device for a file stored at a server computing device and dividing the file into a plurality of chunks. In addition, the method includes, for each chunk of the plurality of chunks of the file, obtaining, by the server computing device, a hash for the chunk, sending, by the server computing device, the hash for the chunk to the client computing device, and after sending the hash, sending, by the server computing device, the chunk to the client computing device if such sending is enabled.

19 Claims, 5 Drawing Sheets

CONTENT DOWNLOAD BASED ON HASHES

TECHNICAL FIELD

The embodiments of the invention relate generally to network communications in operating systems and, more specifically, relate to a mechanism for content download based on hashes.

BACKGROUND

Typically, to transfer a file over the Internet for viewing at a client, the client sends a download request to a server providing the file content, the server responds with the file data, and then the client displays the received file contents locally. When a server receives a request for content from a user, the server will locate the file and start streaming it to the client, without regard to what content the client already has downloaded previously. As a result, this typical data transfer regimen does not account for whether the user already has a portion of this file on their local device and can lead to inefficiencies and redundancies.

For instance, a user may fetch email from a corporate server via an IMAP or POP3 protocol. Then, the same user may go to the company's website for mail lists and see the archives of email on a particular list. The user may then download the email content again, but this time from a different application via a different communication mechanism.

In another example, a user may download a presentation locally from a server on the Internet. If the user wants to view the file again from the Internet, he or she may return to the same location the presentation was obtained from and select the same link used to previously obtain the presentation. If a different server is now serving that download request, the presentation file will be re-downloaded, instead of using the previously-downloaded presentation file from the cache of the user.

In yet another example, a user may download his or her email via an email application on the client. If the network connection drops while a large attachment is being downloaded, the current email application is configured to re-download the attachment from the start on a next email fetch. This re-download may be expensive for the user (if using something like mobile broadband, where connections are flaky). In addition, if the user tries to download the attachment via a web interface to his or her mailbox, the entire file will be downloaded, irrespective of whether the whole file is already downloaded via the email application.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for a mechanism for content download based on hashes. A method of embodiments of the invention includes receiving a request from a client computing device for a file stored at a server computing device and dividing the file into a plurality of chunks. In addition, the method includes, for each chunk of the plurality of chunks of the file, obtaining, by the server computing device, a hash for the chunk, sending, by the server computing device, the hash for the chunk to the client computing device, and after sending the hash, sending, by the server computing device, the chunk to the client computing device if such sending is enabled.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "enabling", "dividing", "calculating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for content download based on hashes. Embodiments of the invention modify the mechanism by which servers and clients on the Internet behave when transferring information. The information transfer protocol (e.g., HTTP, FTP, etc.) is modified so that a server serves a file in chunks (chunk size negotiable) with a hash associated with each chunk. The client uses the chunk hash to determine if it already has this portion of the file. If so, the client informs the server not to serve that particular chunk. If not, the client tells the server to continue serving that chunk. In one embodiment, the client may be a proxy server that can download and maintain the chunks locally, so that other applications requesting similar chunks in the future can be served the chunks locally without involving network transfers or utilizing any server resources.

Figure 1:
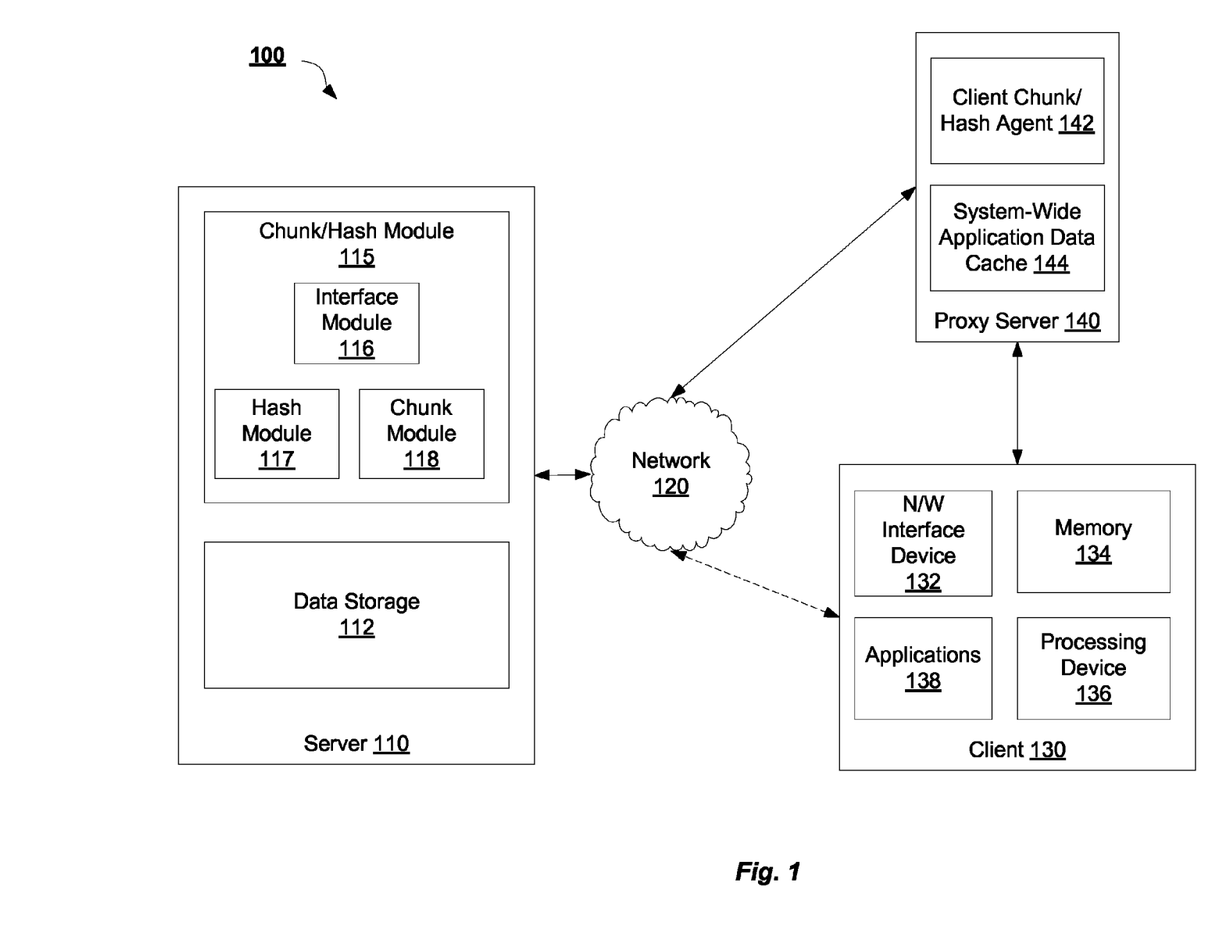
FIG. 1 is a block diagram of a network communication system providing content download based on hashes according to embodiments of the invention.

FIG. 1 is a block diagram of a network communication system 100 providing content download based on hashes according to embodiments of the invention. System 100 includes a server computing device communicably coupled to a client computing device 130 and a proxy server device 140 via network 120. The network 120 may be a private network (e.g., a local area network (LAN), wide area network (WAN), intranet, etc.) or a public network (e.g., the Internet).

In one embodiment, server 110 is a server computing machine operable to provide content and services for one or more applications 138 executed by client 130. Client 130 is a computing machine executing applications 138 using memory 134 and processing device 136, and receiving data to and from applications 138 via network interface device 132 from server 110 over network 120. Applications 138 may include any type of application executed in software, hardware, firmware, or some combination thereof, which accesses content over a network connection. Some examples of applications 138 include, but are not limited to, web browsers, email applications, and real-time communication applications. Each client 130 may execute one or more different types of applications 138.

In one embodiment, server 110 includes a chunk/hash module 115 to provide content stored in data storage 112 in a chunk format to client 130, while also using hashes of these chunks for verification purposes with the client 130. Chunk/hash module 115 may be implemented as software, hardware, firmware, or some combination thereof. Content stored in data storage 112 that may be served by server 110 may include, but is not limited to, HTML pages, CSS scripts, JavaScript programs, video files, and music files.

In some embodiments, chunk/hash module 115 may include an interface module 116 to receive and respond to requests for the content of the server 110. When interface module 116 receives a request, it may first perform a handshake procedure with the client 130, which includes negotiating a chunk size that the data may be divided up into. In one embodiment, the client 130 may initiate this handshake procedure with an inquiry into whether the server 110 supports chunks and hashing for content transmission. The server 110 (e.g., interface module 116) can respond to this inquiry with either an acknowledgment indicating it does support that technique, or an error if the server 110 does not support the technique. In another embodiment, the client 130 may send a generic command to request a list of capabilities that the server 110 supports, in order for the client 130 to determine whether chunks and hashing for content transmission are supported. In some embodiments, a hashing algorithm may also be agreed upon between the server 110 and the client 130 at this stage.

Chunks may be of a size that can be negotiated between the interface module 116 and the client 130. In one embodiment, a typical default chunk size may be 4 KB. In some embodiments, server 110 may restrict chunk size options in order to reduce load on server 110. Once the chunk size has been established, the request is passed to request processing module 117. Request processing module 117 accesses the requested data from data storage 112, and passes this data to chunk module 118 along with the negotiated chunk size.

In some embodiments, the chunk module 118 may seek the chunk boundary, based on the chunk size and the file size, of the data and read the next chunk from that location. In other embodiments, the chunk module 118 may divide the data into the physical chunks.

After a data chunk is accessed, request processing module 117 then passes the data chunks to the hash module 119 in order for the hash module 119 to associate a hash along with each chunk of data. A hash, such as sha1 or sha256, may be used to uniquely identify each chunk. The particular hashing algorithm used to hash the chunk may be previously agreed upon by the server 110 and client 130. In some embodiments, the hash is calculated based on the entire chunk given by the chunk module 118. The hashes may be cached, based on chunk size and data popularity. Once a file associated with a hash is modified, however, the cached hash should be invalidated. In some embodiments, cached hashes may be evicted using a least recently used (LRU) algorithm.

In other embodiments, both of the chunks and the hashes may be cached. In such a scenario, the chunks and their corresponding hashes may be evicted from the cache based on an LRU algorithm. As previously mentioned, if the source file of a chunk/hash pair is modified, then all of the cached hashes associated with the source file, as well as their related chunks, should be invalidated.

In some embodiments, the chunk/hash module 115 need not maintain separate chunks. Instead, the server 110 may seek into the requested files to obtain the chunk and then send a hash for that chunk before starting a new chunk of data. The hashes can be calculated at the time the chunk is created, or at the time of serving a new chunk and then storing the hash for later requests (and in some cases, the associated chunk), or calculated each time the chunk is to be sent across.

Furthermore, the server 110 may choose to store chunks separately for a multiple of chunk sizes per file, not store chunks and compute hash values based on negotiated chunk size, as and when required, or store hash values for chunks based on most often used chunk sizes for files. If any hash values are stored, these values may be part of the server's transient cache, so that the disk space used up by these hash values can be freed and utilized in case of low disk space conditions. One skilled in the art will appreciate that these settings are administrator-tunable. After the hash is calculated or obtained from the cache, request processing module 117 signals to interface module 116 that the data is ready to be served and interface module 116 sends the hash of the chunk to the client 130 over network 120.

In one embodiment, system 100 includes a proxy server 140 to act as a client intermediary between the server 110 and client 130 to store all downloaded and uploaded content associated with applications 138 in a system-wide application data cache 144. In some embodiments proxy server 140 may be located in a separate machine from client 230. In other embodiments, proxy server 140 and client 230 may be located in the same machine.

The system-wide application data cache 144 is used to store all downloaded (and uploaded, if needed) content. This way, client applications 138, such as a web browser or an email client, have access to content that is downloaded in other applications 138. In addition, proxy server 140 includes a client content hash agent 142 that receives all communications to and from the server 110.

In one embodiment, the negotiation of chunk size with the server 110, which was previously discussed above, may be handled by the client chunk/hash agent 142. Prior to negotiating, the client chunk/hash agent 142 indicates to the server 110 that the client 130 (via proxy server 140) is capable of receiving chunks and hashes. If client chunk/hash agent 142 receives a favorable response from the server 130, it then proceeds to negotiate the chunk size or directly fetch chunks. In a case where the server 130 responds to not understanding the chunk-capable request, the client 130 falls back to the existing way of fetching data from server 130.

In some embodiments, when client chunk/hash agent 142 receives a hash from server 110, the client chunk/hash agent 142 compares the received hash to stored hashes kept in the system-wide application data cache 144. If a match is found, then client chunk/hash agent 142 tells the server 110 to skip serving the particular chunk associated with that hash. Then, the client chunk/hash module may serve the chunk to the client 130 from the system-wide application data cache 144 or inform client 130 where to fetch the data from the system-wide application data cache 142. In either case, obtaining the data by the client 130 will be a local communication, thus saving both client and server resources that would have been associated with a network communication.

Figure 2:
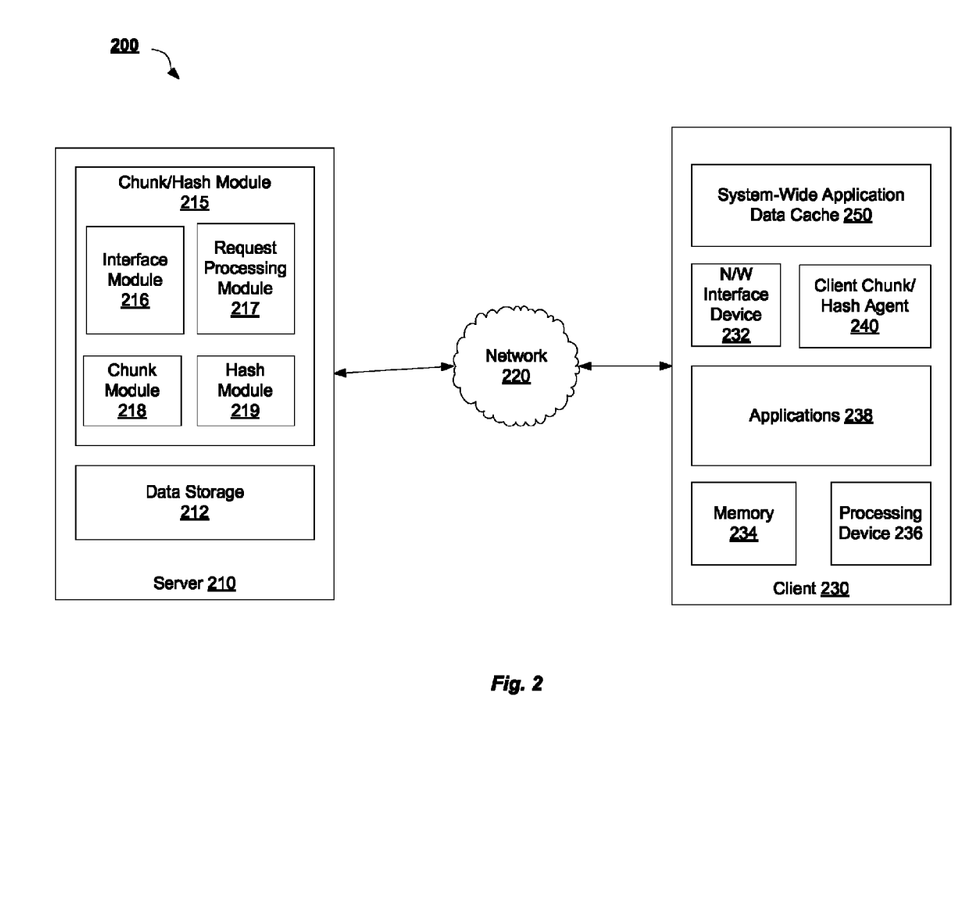
FIG. 2 is a block diagram of another network communication system for providing content download based on hashes according to embodiments of the invention.

In some embodiments, an individual component on the client device 130 may perform the functions of the proxy server 140. FIG. 2 is a block diagram illustrating a network communication system 200 providing content download based on hashes for a client device that includes a component to enable the content download based on hashes according to embodiments of the invention. In one embodiment, system 200 is the same as system 100 described with respect to FIG. 1, except that system 200 does not utilize a proxy server. Instead of utilizing a proxy server to provide the chunking and hashing functionality for content downloads and uploads, system 200 implements the client chunk/hash agent 240 within client 230. In addition, the system-wide application data cache 250 is also kept within client 230. In some embodiments, systems 100 and 200 may be combined to provide local caching, as well as caching on a local network by client systems 130, 230.

In some embodiments, client chunk/hash agent 240 may be implemented as a library written to download or upload chunks and maintain chunks and hashes of data locally. In this way, the applications 238 executing on client 230 that request similar chunks in the future can be served the chunks locally without invoking any network transfers or utilizing any server resources. When implementing client chunk/hash agent 240 as a library, modifications should be made to all applications 238 that use the library, otherwise theses applications 238 will not benefit form the system-wide application data cache 250.

In all other respects, client chunk/hash agent 240 and system-wide application data cache 250 will act in a similar manner as described above with respect to client chunk/hash agent 142 and system-wide application data cache 144 described with respect to FIG. 1.

Figure 3:
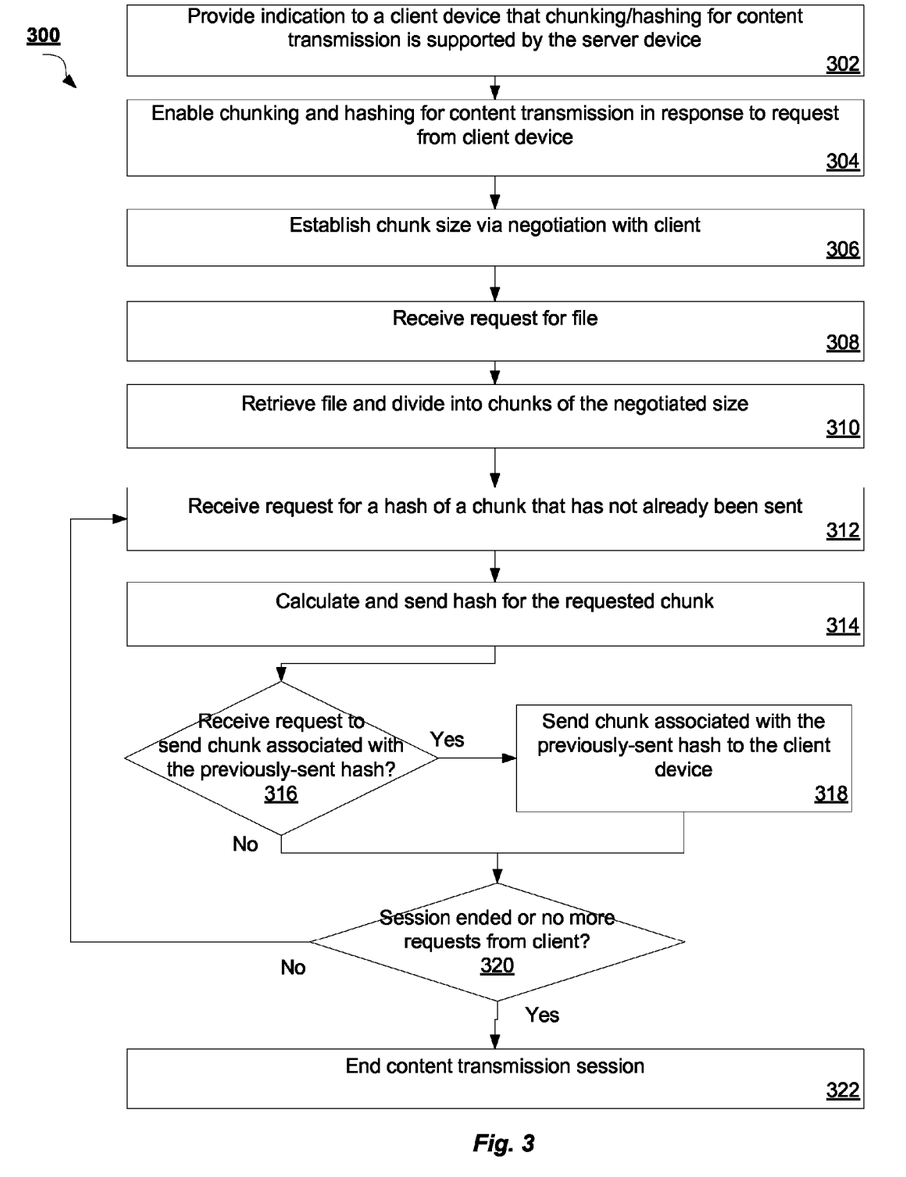
FIG. 3 is a flow diagram illustrating a method for content download based on hashes by a server computing device according to an embodiment of the invention.

FIG. 3 is a flow diagram illustrating a method 300 for content download based on hashes according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by server computing device 110 of FIG. 1.

Method 300 begins at block 302 where an indication is provided to a client device that chunking and hashing for content transmission is supported by the server device. In one embodiment, this indication may be a message sent in response to a direct inquiry about this particular capability from the client device. In another embodiment, the indication may be provided as part of a list of current capabilities provided in response to a generic request for this list from the client device. Then, at block 304, chunking and hashing capabilities for content transmission with the client device are enabled in response to receiving a request to enable such capabilities from the client device.

Subsequently, at block 306, a chunk size for content transmission is established via negotiation with the client device. In one embodiment, the client device may simply request a certain chunk size that the server device can acknowledge. If the server cannot support a particular requested chunk size, then the server may respond with an alternative chunk size that may be acceptable to the client. In another embodiment, the server may provide a list of supported chunk size to the client device, and the client device can select one of these sizes. Once the chunk size is established, a request for a file is then received by the server device from the client device at block 308.

At block 312, the requested file is retrieved from storage or memory on the server device and divided into chunks of the negotiated size. In some embodiments, the total file size may be sent to the client device at this point. At block 314, a request for a hash of a chunk of the file is received at the server device from the client. This requested hash is for a chunk that has not yet been sent to the client device. In some embodiments, the client device may indicate which chunk (e.g., in sequential order) of the file it is requesting a hash for. In addition, the client may also indicate the negotiated chunk size with each request in order to minimize the state required to be kept on the server device.

Then, at block 314, a hash for the chunk is obtained and sent to the client device. In some embodiments, a hashing algorithm previously-agreed upon between the server device and client device may be used to create the hash, such as sha1 or sha256. At decision block 316 it is determined whether a request has been received to send the chunk associated with the previously-sent hash. In some embodiments, this request may be the offset of the file that does not exist on the client. For example, if a client does not have any content for a file, the offset would be 0, indicating the start of the file. In some embodiments, the hash may already be calculated and cached in the server device. This cached hash may be retrieved and sent to the client device.

If a request is received at decision block 316, then at block 318 the chunk associated with the previously-sent hash is sent to the client device. On the other hand, if no request for the chunk is received, the method 300 continues to decision block 320 where it is determined if the previously-sent hash was for the last chunk of the file (or for the last chunk that a hash had not been sent to the client yet).

At decision block 320 it is determined whether the session has ended or if any more requests have been received from the client. If the session has not ended and/or requests have been received from the client, then method 300 returns to block 312 to continue sending hashes of the file chunks to the client device. If the session has ended or no more requests have been received from the client (e.g., over a predetermined time interval), then method 300 continues to block 322 to end the content transmission session with the client device.

Figure 4:
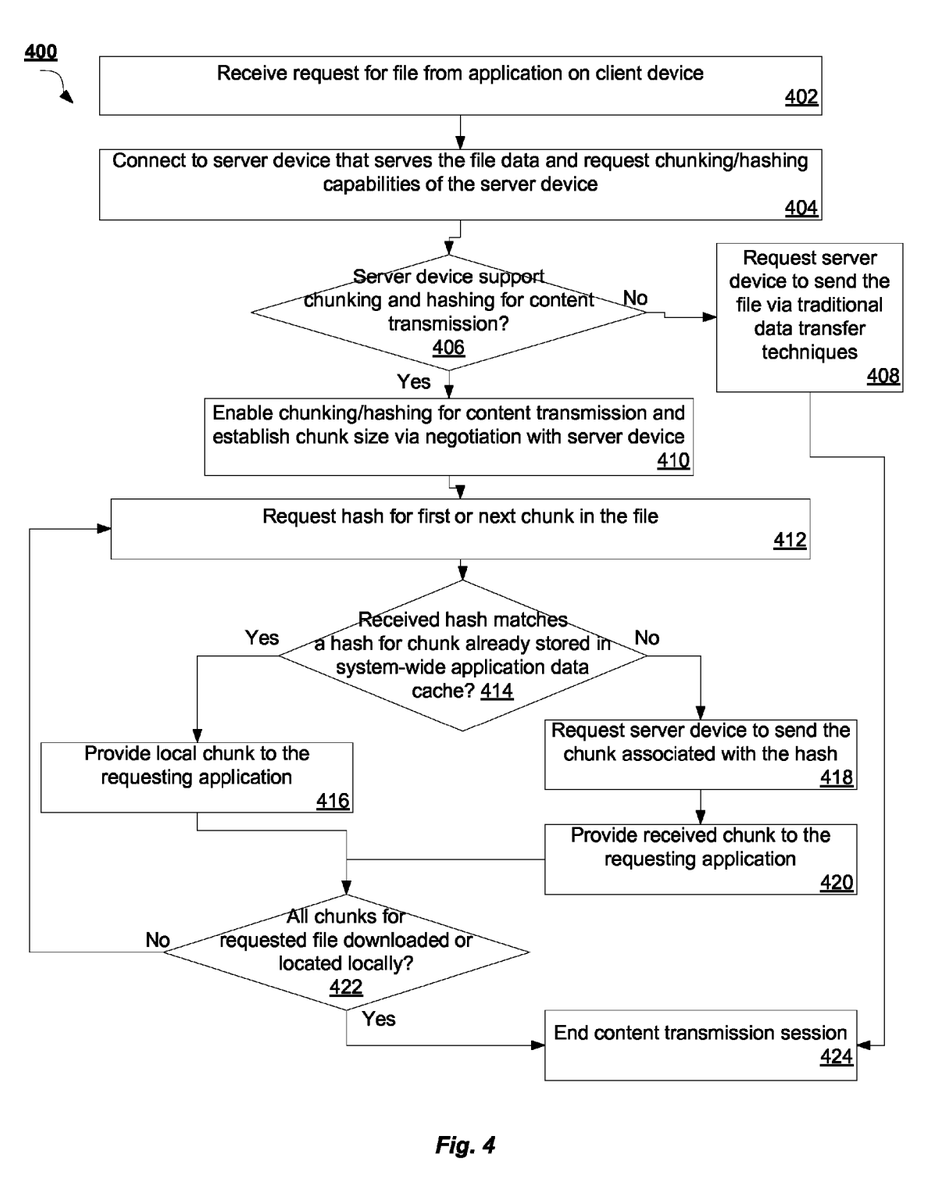
FIG. 4 is a flow diagram illustrating a method for content download based on hashes by a client computing device according to an embodiment of the invention.

FIG. 4 is a flow diagram illustrating a method 400 for content download based on hashes by a client computing device according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by proxy server computing device 140 of FIG. 1.

Method 400 begins at block 402 where a request for a file is received from an application on a client device. In some embodiments the request is received at a proxy server associated with the client device, while in other embodiments the request is received at a library application on the client device. At block 404, a connection is made to a server device that serves the data associated with the file. In addition, chunking and hashing capabilities of the server device are requested. In one embodiment, a direct inquiry about the chunking and hashing capabilities of the server device may be made. In another embodiment, a general inquiry for a list of capabilities of the server device may be requested.

Subsequently, at decision block 406, it is determined whether the server device supports chunking and hashing for content transmission. If not, then at block 408, the server device is requested to send the file via traditional data transfer techniques, and then the content transmission ends at block 424. On the other hand, if the server device does support chunking and hashing, then method 400 proceeds to block 410.

At block 410, chunking and hashing for content transmission is enabled and a chunk size is negotiated with the server device. In one embodiment, a preferred chunk size may be directly requested from the server device, and the server device can accept this request with an acknowledgment. If the server cannot support a requested chunk size, then the server may respond with an alternative chunk size that may be acceptable to the client. In another embodiment, the server may provide a list of supported chunk sizes to the client device, and the client device can select one of these sizes. Once the chunk size is established, a hash for the first chunk in the file is requested at block 412.

Then, at decision block 414, it is determined whether the received hash matches hashes of any chunks already stored in a system-wide data application cache associated with the client device. In one embodiment, the client device and server device may have previously-agreed on a hashing algorithm, such as sha1 or sha256, to implement, and the client device may uniformly apply this algorithm on all chunks stored locally. These computed hashes are then used for comparison purposes to the received hash at decision block 414. If a matching hash is found, then at block 416, the local chunk associated with that matching hash is provided to the requesting application without invoking any network transfers or utilizing any server device resources. Then, method 400 proceeds to decision block 422, which is described below.

If the received hash does not match any hashes of local chunks, then method 400 continues to block 418 where a request is sent to the server device to send the chunk associated with the received hash. Then, at block 420, the received chunk is provided to the requesting application. Then, method 400 proceeds to decision block 422.

At decision block 422, it is determined whether all chunks for a requested file have been downloaded or located locally. The determination whether all chunks have been downloaded or located may be made by comparison to the file size that the server device may have previously provided or by an indication from the server device that a particular hash is for the last chunk of a file. If not, method 400 returns to block 412 to continue requesting and receiving hashes and chunks. If all chunks have been received and/or located, then method 400 proceeds to block 424 where content transmission session is ended. In one embodiment, the determination on whether all chunks have been downloaded may be done by requesting the server for the hash of the entire file, and comparing that to the hash of the file that exists locally.

Figure 5:
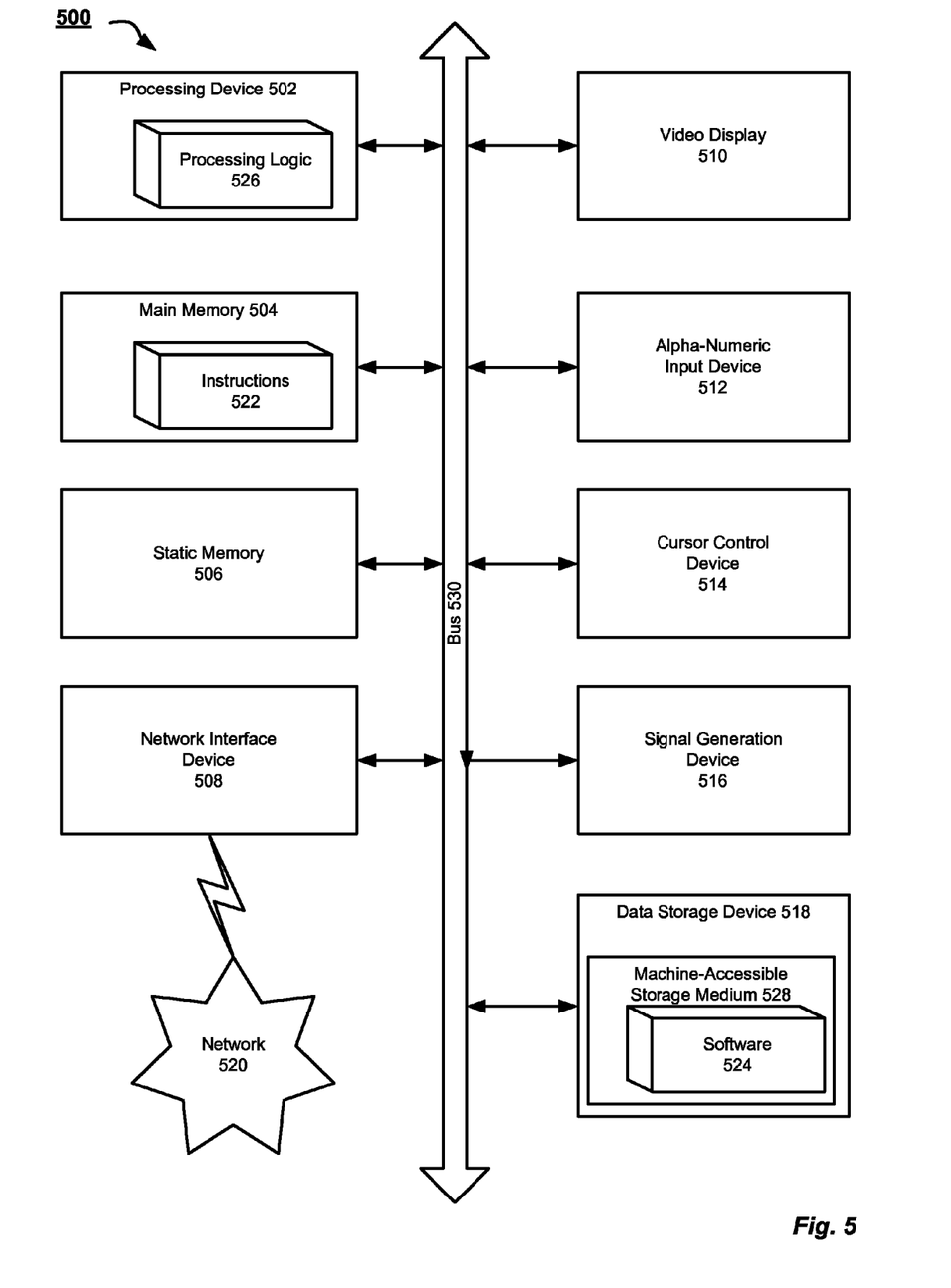
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC)

microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored software 524 embodying any one or more of the methodologies of functions described herein. For example, software 524 may store instructions to perform content download based on hashes by chunk/hash module 115, 215 and client chunk/hash agent 142, 240 described with respect to FIG. 1. The software 524 may also reside, completely or at least partially, within the main memory 504 and/or within the processing device 502 during execution thereof by the computer system 500; the main memory 504 and the processing device 502 also constituting machine-accessible storage media.

The machine-readable storage medium 528 may also be used to store instructions to perform methods 300 and 400 for content download based on hashes described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by a server computing device, a request from a client computing device for a file stored at the server computing device, wherein the client computing device supports a chunking and hashing capability for content transmission from a plurality of applications executed at the client computing device and comprises a system application data cache to store content transmitted using the chunking and hashing capability, the system application data cache accessible by each of the plurality of applications to reference content communicated with other applications of the plurality of applications;
   providing an indication to the client computing device that the chunking and hashing capability for content transmission is supported by the server computing device;
   negotiating, by the server computing device with the client computing device, a size of chunks of data for transmission, the negotiating via a list of supported chunk sizes sent to the client computing device and a response from the client computing device indicating which supported chunk size the client computing device prefers;
   dividing, by the server computing device, the file into a plurality of chunks; and
   for each chunk of the plurality of chunks of the file:
      obtaining, by the server computing device, a hash for the chunk;
      sending, by the server computing device, the hash for the chunk to the client computing device, wherein the client computing device computes a local hash of each chunk stored in the system-wide application data cache to compare to the received hashes from the server device, wherein a hash algorithm to use to compute the local hashes and the received hashes is determined from an agreement made between the client computing device and the server computing device;
      receiving, by the service computing device, a request to send the chunk associated with the hash in response to the client computing device determining that the hash does not match hashes stored at the client computing device; and
      sending, by the server computing device in response to the received request, the chunk associated with the hash to the client computing device if such sending is enabled.

2. The method of claim 1, wherein providing the indication further comprises:
   receiving an inquiry from the client computing device asking whether the server computing device specifically supports the chunking and hashing capability for content transmission; and
   sending an acknowledgment to the client computing device in response to the inquiry.

3. The method of claim 1, wherein providing the indication further comprises:
   receiving a request for a general list of capabilities of the server computing device from the client computing device; and
   sending the general list of capabilities of the server computing device to the client computing device, wherein the general list of capabilities comprises the chunking and hashing capability for content transmission.

4. The method of claim 1, wherein the size of the chunks is negotiated between the server computing device and the client computing device via a request from the client computing device for a specific chunk size and a response to the client computing device indicating that the specific chunk size is acceptable to the server computing device.

5. A method, comprising:
   receiving, by a client computing device, a request for a file from an application executed by the client computing device, wherein the client computing device supports a chunking and hashing capability for content transmission from a plurality of applications executed at the client computing device and comprises a system application data cache to store content transmitted using the chunking and hashing capability, the system application data cache accessible by each of the plurality of applications to reference content communicated with other applications of the plurality of applications;

receiving, by the client computing device from the server computing device, an indication that a server computing device that serves the file supports the chunking and hashing capability for content transmission;

negotiating, by the client computing device with the server computing device, a size of chunks of data for transmission, the negotiating via a list of supported chunk sizes sent to the client computing device and a response from the client computing device indicating which supported chunk size the client computing device prefers;

in response to agreeing on the size of the chunks of data for transmission with the server computing device, for each chunk of the file, wherein each chunk is of a predetermined chunk size:

requesting a hash for the chunk from the server computing device;

computing a local hash of each chunk stored in the system-wide application data cache to compare to the received hashes from the server device, wherein a hash algorithm to use to compute the received hashes and the local hashes is determined from an agreement made between the client computing device and the server computing device;

determining whether a received hash matches one of a plurality of local hashes for one or more local chunks previously received by the client computing device and stored in a system-wide application data cache associated with the client computing device;

in response to the received hash matching one of the plurality of local hashes, providing a local chunk associated with the matching local hash to the requesting application; and in response to the received hash not matching any of the hashes, requesting the chunk associated with the received hash from the server computing device and providing a received chunk associated with the received hash to the requesting application.

6. The method of claim 5, wherein the client computing device is a proxy server device on a local network of a computing device executing the application.

7. The method of claim 5, wherein the client computing device comprises a library application to provide the chunking and hashing capability for the client computing device.

8. The method of claim 5, further comprising determining whether all chunks of the requested file have been provided to the application by comparing a hash of the entire file provided to the application to a hash of the entire file provided by the server computing device.

9. The method of claim 5, further comprising determining whether the server computing device supports the chunking and hashing capability for content transmission.

10. The method of claim 5, wherein the predetermined chunk size is negotiated between the client computing device and the server computing device by the client computing device requesting a particular chunk size and the server computing device responding with an acknowledgment to the request.

11. A system, comprising:
a memory;
a storage device to store content;
a processing device communicably coupled to the memory and the storage device; and a chunking and hashing module executable from the memory by the processing device, the chunking and hashing module to:

enable a chunking and hashing capability for content transmission in response to a request from a client computing device to implement the chunking and hashing capability, wherein the client computing device supports a chunking and hashing capability for content transmission from a plurality of applications executed at the client computing device and comprises a system application data cache to store content transmitted using the chunking and hashing capability, the system application data cache accessible by each of the plurality of applications to reference content communicated with other applications of the plurality of applications;

receive a request for a file from the client computing device, the file stored in the storage device;

provide an indication to the client computing device that the chunking and hashing capability for content transmission is supported by the server computing device;

negotiate, with the client computing device, a size of chunks of data for transmission, the negotiating via a list of supported chunk sizes sent to the client computing device and a response from the client computing device indicating which supported chunk size the client computing device prefers;

divide the file into a plurality of chunks; and for each chunk of the plurality of chunks of the file:
obtain the hash for the chunk;
send the hash for the chunk to the client computing device, wherein the client computing device computes a local hash of each chunk stored in the system-wide application data cache to compare to the received hashes from the server device, wherein a hash algorithm to use to compute the local hashes and the received hashes is determined from an agreement made between the client computing device and the server computing device;

receive a request to send the chunk associated with the hash in response to the client computing device determining that the hash does not match hashes stored at the client computing device; and send, in response to the received request, the chunk associated with the hash to the client computing device if such sending is enabled.

12. The system of claim 11, wherein the processing device providing the indication further comprises the processing device to:

receive an inquiry from the client computing device asking whether the system specifically supports the chunking and hashing capability for content transmission; and send an acknowledgment to the client computing device in response to the inquiry.

13. The system of claim 11, wherein the processing device providing the indication further comprises the processing device to:

receive a request for a general list of capabilities of the server computing device from the client computing device; and send the general list of capabilities of the server computing device to the client computing device, wherein the general list of capabilities comprises the chunking and hashing capability for content transmission.

14. The system of claim 11, wherein the size of the plurality of chunks is negotiated between the processing device and the client computing device via a request for a specific chunk size from the client computing device and a response to the client computing device indicating that the specific chunk size is acceptable to the server computing device.

15. A non-transitory machine-readable storage medium including instructions that, when accessed by a processing device, cause the processing device to perform operations comprising:

receiving, by the processing device of a client computing device, a request for a file from an application executed by the client computing device, wherein the client computing device supports a chunking and hashing capability for content transmission from a plurality of applications executed at the client computing device and comprises a system application data cache to store content transmitted using the chunking and hashing capability, the system application data cache accessible by each of the plurality of applications to reference content communicated with other applications of the plurality of applications;

receiving, by the client computing device from the server computing device, an indication that a server computing device that serves the file supports the chunking and hashing capability for content transmission;

negotiating, by the client computing device with the server computing device, a size of chunks of data for transmission, the negotiating via a list of supported chunk sizes sent to the client computing device and a response from the client computing device indicating which supported chunk size the client computing device prefers;

in response to agreeing on the size of the chunks of data for transmission with the server computing device, for each chunk of the file, wherein each chunk is of a predetermined chunk size:

requesting a hash for the chunk from the server computing device;

computing a local hash of each chunk stored in the system-wide application data cache to compare to the received hashes from the server device, wherein a hash algorithm to use to compute the received hashes and the local hashes is determined from an agreement made between the client computing device and the server computing device;

determining whether a received hash matches one of a plurality of local hashes for one or more local chunks previously received by the client computing device and stored in a system-wide application data cache associated with the client computing device;

in response to the received hash matching one of the plurality of local hashes, providing a local chunk associated with the matching local hash to the requesting application; and in response to the received hash not matching any of the hashes, requesting the chunk associated with the received hash from the server computing device and providing a received chunk associated with the received hash to the requesting application.

16. The non-transitory machine-readable storage medium of claim 15, wherein the client computing device is a proxy server device on a local network of a computing device executing the application.

17. The non-transitory machine-readable storage medium of claim 15, wherein the client computing device comprises a library application to provide the chunking and hashing capability for the client computing device.

18. The non-transitory machine-readable storage medium of claim 15, wherein the data, when accessed by the machine, causes the machine to perform further operations comprising determining whether all chunks of the requested file have been provided to the application by comparing the total size of all provided chunk to a total size of the file, wherein the total size of the file is provided by the server computing device.

19. The non-transitory machine-readable storage medium of claim 15, wherein the predetermined chunk size is negotiated between the client computing device and the server computing device by the client computing device requesting a particular chunk size and the server computing device responding with an acknowledgment to the request.

* * * * *